United States Patent [19]

Van Orsdel

[11] 3,722,071
[45] Mar. 27, 1973

[54] BRAZING POWDER DEPOSITION METHOD

[75] Inventor: John R. Van Orsdel, Columbus, Ohio

[73] Assignee: Aeronca, Inc., Middleton, Ohio

[22] Filed: Sept. 30, 1971

[21] Appl. No.: 185,363

Related U.S. Application Data

[62] Division of Ser. No. 26,629, April 8, 1970, abandoned.

[52] U.S. Cl. .....................29/471.1, 29/488, 29/500, 117/16, 117/31
[51] Int. Cl. ..............................................B23k 31/02
[58] Field of Search......29/471.1, 488, 500, 455 LM, 29/484; 228/33; 117/16, 31

[56] References Cited

UNITED STATES PATENTS

| | | | |
|---|---|---|---|
| 3,365,787 | 1/1968 | Forsberg et al | 29/471.1 |
| 3,479,731 | 11/1969 | Mantel et al | 29/471.1 X |

*Primary Examiner*—J. Spencer Overholser
*Assistant Examiner*—Richard B. Lazarus
*Attorney*—Wood, Herron and Evans

[57] ABSTRACT

Apparatus and method, in preferred form, particularly adapted for evenly depositing a brazing powder at the interface of a honeycomb sheet and a substrate. The apparatus is comprised of a head having a working face defined by a porous medium, the medium permitting suction therethrough but preventing powder from passing therethrough. The face of the head is provided with shims of a preselected thickness, that thickness being dependent on the weight of powder per unit area to be deposited. In use, a partial vacuum is established on one side of the head's working face and the powder to be deposited is placed on the other side of the face, the powder thereby being held to the face. A definite and reproducible powder thickness is established by scraping excess powder off the face through use of a knife edge in cooperation with the shims. The honeycomb sheet is preliminarily fixed to the substrate such as, for example, by tack-welding. Thereafter, the powder-coated face of the head is positioned over the honeycomb sheet and the vacuum released. This allows the powder to drop from the head's working face through the honeycomb cells onto the substrate surface. Such results in an even distribution of powder on the exposed area of the substrate, and is a practical method of achieving such distribution in that no skilled operator is required.

5 Claims, 10 Drawing Figures

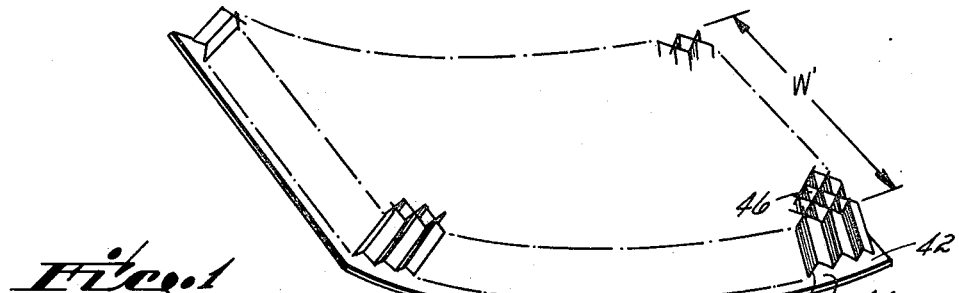
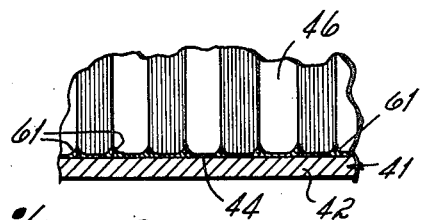
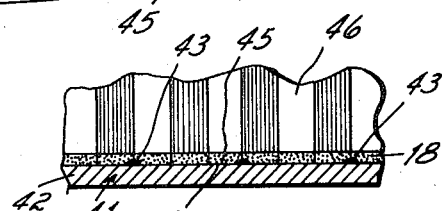
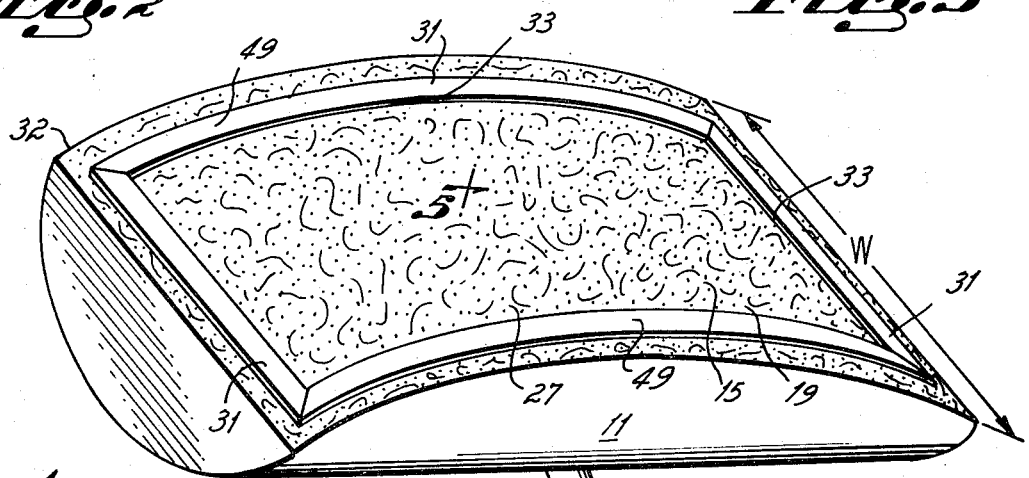
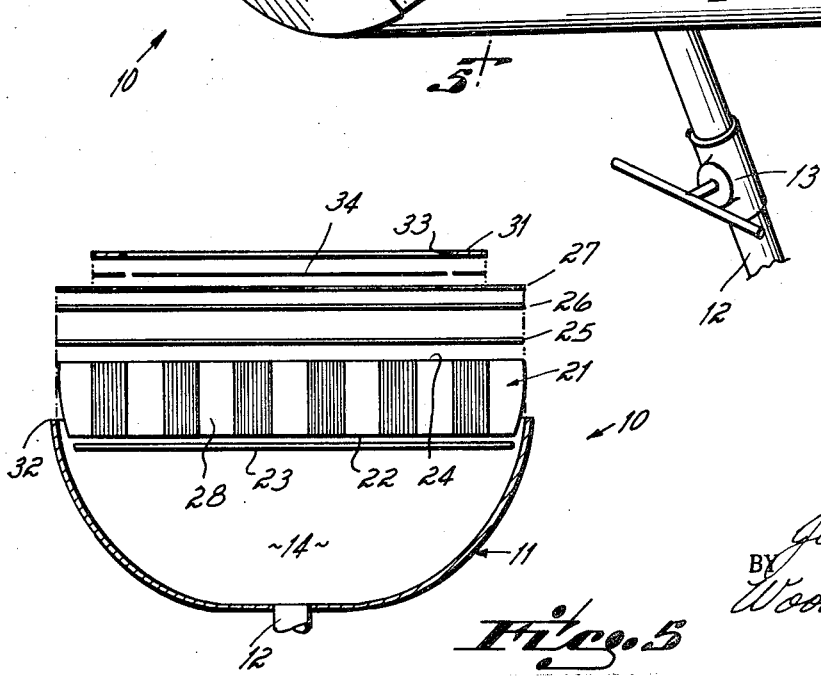

BRAZING POWDER DEPOSITION METHOD

This application is a divisional of U.S. Ser. No. 26,629, filed Apr. 8, 1970 and now abandoned.

This invention relates to the deposition of powder on a substrate. More particularly, this invention relates to a novel apparatus and method for the deposition of powder on a substrate through a perforate sheet.

One main use for a composite assembly of a honeycomb sheet and a substrate is an inter-stage seal for jet engines. Such seals are required to minimize leakage between the stages of a jet engine and, thereby, provide increased engine efficiency. Each seal is substantially ring-like in configuration and is positioned about the inner periphery of the engine shell. The ring-like seals are located in the same cross-sectional plane as the turbine blades, and one seal is normally positioned to cooperate with each series of turbine blades.

In the manufacture of such seals it is highly desirable that the honeycomb sheet be brazed to the substrate in a manner which completely isolates each cell of the honeycomb sheet from the other at the interface of the honeycomb sheet and the substrate. A major problem that has arisen in constructing the honeycomb sheet-substrate assembly is that of depositing the brazing powder evenly and equally at the bottom of each cell of the honeycomb sheet onto the face of the substrate. Even deposition is required so that when the assembly is subjected to heat, the brazing powder will melt and form fillets at the interface of the honeycomb cells with the substrate. In cases of unequal distribution, where too much brazing powder is present the brazing powder has a tendency to corrode the thin honeycomb cell walls and cause holes therein upon being subjected to brazing temperatures; on the other hand, too little brazing powder results in an assembly with air leakage between honeycomb cells at the honeycomb sheet-substrate interface.

There are various methods known to the prior art by means of which a powder can be deposited through a perforate sheet, for example, a honeycomb sheet, onto a substrate. One prior art method uses a salt shaker filled with powder, the powder being deposited through the perforate sheet onto the substrate by shaking the salt shaker. Such a method results in a substantial uneven distribution of the powder on the substrate, is quite time consuming, and requires experience by the operator. A second prior art method uses a slurry of the powder to be deposited, the slurry first being brushed onto the substrate and the perforate sheet thereafter being placed on the substrate. Such a method also results in a non-uniformity of application, is relatively time consuming, and requires experience by the operator. A third method uses a plastic tape which incorporates the powder, the tape being laid on the surface of the substrate prior to the honeycomb sheet being placed on the substrate. When brazing a honeycomb sheet to a substrate such a method causes problems in that the tape prevents effective tack-welding of the honeycomb sheet to the substrate prior to the brazing step. Further, the tape is costly and the method is not easy to use in that the protective sheet for the tape's adhesive backing must be removed prior to use.

The deposition apparatus and method of this invention, as used to deposit powder through a perforate sheet onto a substrate, eliminates the problems associated with the prior art and provides substantial advantages over the prior art. The apparatus basically includes a head having a working face defined by a porous medium, the medium permitting suction therethrough but preventing powder from passing therethrough. The face of the head is provided with shims of a preselected thickness, that thickness being dependent on the weight of powder per unit area to be deposited. In use, a partial vacuum is established on one side of the head's working face and the powder to be deposited is placed on the other side of the face. A definite and reproducible powder thickness is established on the face by scraping excess powder off through use of a knife edge in cooperation with the shims.

When used to braze a perforate sheet, the perforate sheet is preliminarily fixed to the substrate such as, for example, by tack-welding. Thereafter, the powder-coated face of the head is positioned over the honeycomb sheet and the vacuum released. This allows the powder to drop from the head's working face through the honeycomb cells onto the substrate surface. Subsequently the assembly is subjected to heat to complete the brazing together of the perforate sheet and substrate.

The advantages of the apparatus and method of this invention include the relatively even deposition or distribution of the powder over the exposed or open surface area of the substrate. Such an even deposition can be achieved quite quickly and rapidly. Further, a minimum of skill on the part of the operator is required to operate the apparatus and make use of the method. Further, the deposition of the powdered material may occur through the perforate sheet onto either a flat or a curved surface. Further, the powder may be deposited onto the substrate in stepped thickness, i.e., in heavier layers through one area of the perforate sheet and in lighter layers through another area of the perforate sheet. Further, the apparatus is relatively inexpensive to construct, and is inexpensive to maintain.

Other objectives and advantages of the invention will be more readily apparent from the following detailed description taken in conjunction with the drawings in which:

FIG. 1 is a perspective view of one section of a ring-like jet engine seal comprised of a honeycomb sheet brazed to a substrate, such having been accomplished through use of the principles of this invention;

FIG. 2 is a cross-sectional view taken through a segment of FIG. 1 illustrating the honeycomb sheet brazed to the substrate;

FIG. 3 is a view similar to FIG. 2 but illustrating deposition of the brazed powder prior to exposure to a brazing temperature;

FIG. 4 is a perspective view of apparatus in accordance with the principles of this invention;

FIG. 5 is an exploded, cross-sectional view taken generally along lines 5—5 of FIG. 4;

Figure 6:
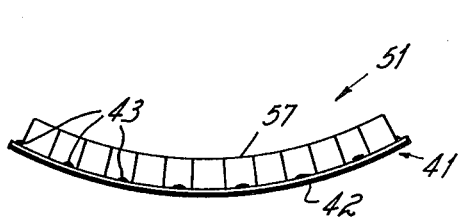
FIG. 6 is a cross-sectional view illustrating the honeycomb sheet substrate subassembly tack-welded together.

The powder deposition apparatus 10 of this invention is particularly illustrated in FIGS. 4 and 5. From FIG. 4 it will be seen that the apparatus 10 includes a head 11 and handle 12. The head 11 is substantially hollow inside and the handle 12 also serves as a vacuum line to the head, the handle being interconnected with a suitable vacuum source, not shown. Valve 13 is provided in the vacuum line or handle 12 for selectively exposing the inside area 14 of the head 11 to a vacuum as desired.

The head 11 is airtight except for working face 15. Working face 15 is a porous medium which permits air to pass therethrough in response to the vacuum created inside the head 11, but which prevents powder 18 (FIG. 7) deposited on the outside 19 of the face to pass therethrough. The head's face 15 is mounted to a honeycomb panel 21 fixed to the inside periphery of the head 11, the honeycomb panel 21 being primarily for support of the porous medium components on the exposed face 19 of the head 11.

The inside face 22 of the honeycomb panel 21 carries a relatively porous, wire mesh sheet 23, either woven or not woven, such as manufactured in accordance with U.S. Pat. No. 2,925,650. The outer face 24 of the honeycomb panel 21 is faced with a paper or metal sheet 25 having relatively large holestherein. On top of the large hole paper or metal sheet 25 there is placed a relatively small hole paper or metal sheet 26. On top the small hole paper or metal sheet 26 is provided a sheet of filter paper 27 such as is commonly used in chemical laboratories.

The primary function of the large 25 and small 26 hole perforate paper or metal sheets is simply to provide support for the filter paper 27 to prevent the filter paper from being deformed or torn into the cells 28 of the honeycomb sheet panel 21 in response to the vacuum pulled within the head 11. The filter paper 27 may, for example, be a No. 1 Watman filter paper, and the large 25 and small 26 hole sheets are preferably of a paper or metal weight sufficient to support the filter paper against the vacuum pulled inside the head 11. The filter paper 27, of course, is sized so that the particle size powder 18 to be deposited thereon does not pass through the paper 27 in response to the vacuum pulled inside the head 11.

The exposed working face 15 of the apparatus 10, i.e., the filter paper 27, is provided with shims or spacers 31 about the outer periphery 32 of the head 11. The geometrical configuration of the shims 31 on face 15 is preferably formed in accordance with the surface geometry of the substrate on which the powder 18 is to be deposited. That is, if the substrate is circular the geometry of the shims would be circular and of a slightly greater diameter than the diameter of the substrate. On the other hand, if the substrate is rectangular the geometry of the shims 31 is rectangular, as illustrated in FIG. 4, and the dimensions of the inside edge 33 of the shims is preferably slightly greater than the outside dimensions of the substrate. The shims 31 are held to the exposed face 15 of the apparatus 10 by a double face adhesive tape 34.

The required weight of powder per area of substrate is calculated prior to mounting shims 31 on the working face 15 of the apparatus 10. Knowing the weight per unit area of powder desired, and knowing the weight per volume of the powder, the thickness of the shims 31 can be easily calculated taking into account the thickness of the double faced adhesive tape used to mount the shims. For example, to achieve a deposition of 0.75 grams per square inch of a brazing alloy powder, such as B50T50–S2 used by General Electric Corp., and assuming that the double faced adhesive tape 34 is of a thickness about 0.004 inch, the calculated shim 31 thickness required is about 0.003 inch. Further, and for example, to achieve a deposition of 1.1 grams per square inch of the same brazing alloy powder, and assuming the double faced adhesive tape is of about 0.004 inch in thickness, a shim thickness of about 0.005 inch is required.

The apparatus of this invention is used in the method illustrated in FIGS. 3 and 6–10 to fabricate a section of a ring-like seal for jet engines as illustrated in FIGS. 1 and 2. The apparatus and method are particularly useful in brazing a honeycomb sheet 41 of a high temperature alloy, such as a nickel base superalloy sold as Hastalloy X by Union Carbide Corporation, Materials Systems Division, 1030 West Park Avenue Kokomo, Ind. to a solid plate substrate 42 of the same material. In the method, the honeycomb sheet 41 is first tack-welded as at 43 (FIG. 6), to the substrate 42 at a series of points throughout the interface area 44. The tack-welds 43 are provided sufficiently close together so as to assure that the face 45 of the honeycomb sheet 41 is in contact with the face 44 of the substrate 42.

Figure 7:
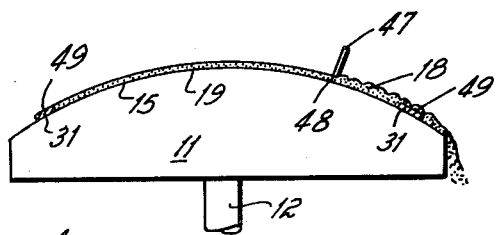
FIG. 7 is a side view of the apparatus shown in FIG. 4 illustrating charging of the apparatus with brazing powder.

The brazing alloy described above, in powder form 18, is poured onto the upturned face 15 of the apparatus 10, see FIG. 7. The brazing powder 18 is arranged over the surface of the face 15 so that that area of the face inside the geometrical configuration defined by the shims 31 is completely covered with brazing powder 18. The excess of the brazing powder 18 is then wiped off the face 15 of the head 11 by means of a straight-edge 47. The scraping edge 48 of the straight-edge 47 rides over the top surface 49 of the shims 31 and, thereby, distributes the powder 18 into an even layer of known depth on the face 15 of the head 11. A vacuum is pulled on the head 11 through line 12 during the entire period of time when the powder 18 is deposited on the working face 15. The vacuum acts to retain the brazing powder 18 on the face 15 in exactly that amount determined by virtue of the straight-edge 47 and the shims 31 even when the head 11 is inverted from that position illustrated in FIG. 7 to that position illustrated in FIG. 8.

Figure 8:
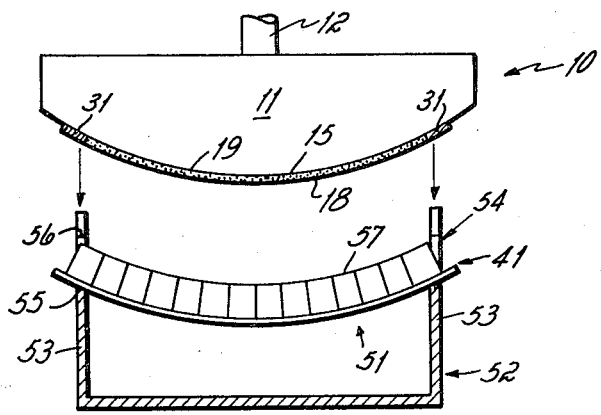
FIG. 8 is a side view similar to FIG. 7 illustrating placement of the apparatus in a powder depositing attitude relative to the honeycomb sheet and substrate through use of a jig.
Figure 9:
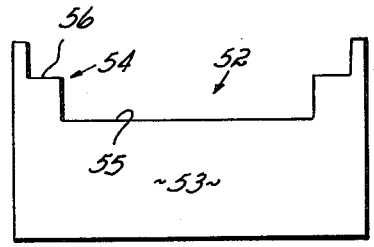
FIG. 9 is an end view of the jig shown in FIG. 8.

As shown in FIG. 8, with the honeycomb sheet 41 tack-welded to the substrate 42 the tack-welded subassembly 51 is supported in a jig 52. Each end 53 of the jig 52 is provided with a stepped configuration 54, the lower step 55 being of a width to support the underside of the tack-welded assembly 51 and the top ledge 56 being of a width to support the head 11 on its face 15.

When the head 11 and tack-welded subassembly 51 are placed in operating relation with the jig 52, the face 15 of the head is held in spaced relation from face 57 of the honeycomb sheet 41. The width W of the head 11 is substantially wider than the width W' of the substrate-honeycomb sheet assembly 51 so that the head can be positioned on the ledge 56 of the jig relative to the step 55 of the jig which holds the tack-welded assembly 51.

Note that ledge 56 is positioned above steps 55 a sufficient distance so that a gap on the order of one-eighth inch or one-fourth inch is established when the head 11 is positioned in the jig 52. Further, note that the curvature of head's face 15 is substantially the same as the curvature of honeycomb sheet's face 57 and of substrate 42. That is, it is preferred that the gap between face 15 of head 11 and face 44 of the substrate be even over that area of the substrate on which powder 18 is to be deposited by head 11. Of course, if the face 44 of substrate 42 were planar, then it would be preferred that face 15 of head 11 also be planar.

After the head 11 and tack-welded subassembly 51 are positioned in the jig 52, the vacuum on the head is released by closing control valve 13 on the handle 12. At this point, the powder 18 retained on the face 15 of the head 11 is released evenly and uniformly, and the powder drops through the cells 46 of honeycomb sheet 41 down onto the exposed top surface 44 of the substrate 42 due to gravity. Thus, the powder 18 is deposited on the top surface 44 of the substrate 42 through the perforate or honeycomb sheet 41. To achieve complete dissociation of the powder 18 from the face 15 of the apparatus' head 11 it may be necessary to tap the head 11 lightly with a blunt instrument; such a tapping assures that all powder 18 held to the face of the head is released therefrom.

Once the powder 18 has been released from the head 11 and fallen by gravity through the cells 46 onto the top surface 44 of the substrate 42, the head is raised from its operating position with the jig 52. At this point a binder material is sprayed into the cells 46 of the honeycomb sheet 41 to temporarily bind the powder 18 deposited on the substrate 42 in position until the tack-welded subassembly 51 can be inserted into a brazing furnace, not shown. The spray 58 is preferably composed of an acrylic plastic as it has been found that the acrylic plastic vaporizes readily in a brazing furnace. Such an acrylic plastic spray 58 may be applied simply through use of a pressurized spray can 59. One acrylic spray 58 found particularly useful is No. 1000 Clear Plastic marketed by Spray-On Products, Inc., Bedford Heights, Ohio.

Figure 10:
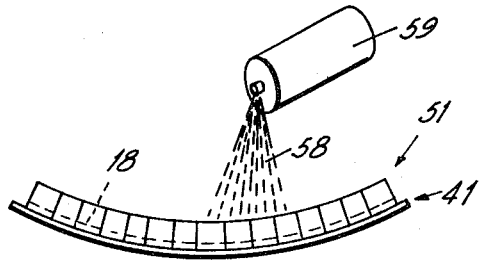
FIG. 10 is a side view of the honeycomb sheet-substrate subassembly, with brazing powder deposited, illustrating application of a binder to the powder deposited on the substrate.

Once the brazing powder 18 has been deposited by gravity onto the substrate 42 through the honeycomb sheet 41, and once the powder has been bound in place by spray 58, as illustrated in FIGS. 3 and 10, the tack-welded subassmebly 51 with brazing powder is transferred to the brazing furnace, not shown. The brazing furnace, in the case of that particular brazing powder alloy recited above for brazing the honeycomb sheet 41 and substrate 42 of that particular high temperature alloy recited above, is raised to approximately 2,000° F. and is provided with a non-oxidizing atmosphere. At this heat level, the acrylic plastic is burned off the substrate and honeycomb sheet, the vaporized acrylic plastic simply being exhausted through a vacuum system associated with the furnace. Further, the brazing powder liquifies to run into the crevices at the interface 44, 45 of the honeycomb sheet and substrate to completely seal the honeycomb sheet to the substrate, fillets 61 being formed at the interface of the cell's 46 walls with the face 44 of the substrate, see FIG. 2.

Having completely described in detail the preferred embodiment of my invention, what I desire to claim and protect by Letters Patent is:

1. A method of brazing one side of a metal honeycomb sheet to one side of a metal substrate through use of a brazing powder comprising the steps of placing the metal honeycomb sheet side and metal substrate side in contact one with the other, providing apparatus having a working face defined by a porous medium that permits suction therethrough but prevents the brazing powder from passing therethrough, and attaching to said face at lease one shim of a preselected thickness that is dependent on the weight of brazing powder per unit area to be deposited, establishing a vacuum inside of said head, depositing the brazing powder on said working face after the vacuum is established, striking the brazing powder off into an even layer on said working face through use of a straight edge in cooperation with said shim, positioning said working face over the metal substrate, the metal honeycomb sheet being interposed between said working face and the metal substrate, thereafter releasing the vacuum inside of said head to permit the brazing powder to fall by gravity onto the metal substrate through the metal honeycomb sheet, and thereafter subjecting the metal honeycomb sheet and metal substrate to brazing temperature for affixing the honeycomb sheet to the substrate.

2. A method as set forth in claim 1 including the step of temporarily binding the brazing powder in position on the face of the metal substrate through use of a binder adapted to volatize after the brazing powder has been deposited thereon but before brazing temperature has been reached.

3. A method as set forth in claim 2 wherein the binder is sprayed onto the brazing powder.

4. A method as set forth in claim 2 including the steps of tack welding the metal honeycomb sheet to the metal substrate prior to deposition of the brazing powder onto the substrate, and subjecting the tack welded subassembly with brazing powder deposited thereon to brazing temperature after the brazing powder has been bound in position by the binder.

5. A method as set forth in claim 1 including the step of creating a substantially even fixed gap between said working face and the metal honeycomb sheet prior to releasing the vacuum.

* * * * *